United States Patent
Hirayama

Patent Number: 6,044,262
Date of Patent: Mar. 28, 2000

[54] WIRELESS DEVICE WITH AUTOMATIC AUTO-RESPONSE SETTING FUNCTION

[75] Inventor: Shoji Hirayama, Kodama-gun, Japan

[73] Assignee: NEC Corporation, Tokyo, Japan

[21] Appl. No.: 08/956,385

[22] Filed: Oct. 23, 1997

[30] Foreign Application Priority Data

Oct. 24, 1996 [JP] Japan .................................. 8-282661

[51] Int. Cl.[7] .................................................. H04M 11/00
[52] U.S. Cl. ........................ 455/412; 455/412; 455/413; 455/456; 455/525
[58] Field of Search .................................. 455/412, 413, 455/414, 423, 426, 421, 456, 550, 567, 425, 525

[56] References Cited

U.S. PATENT DOCUMENTS

| | | | |
|---|---|---|---|
| 5,257,400 | 10/1993 | Yoshida | 455/33.1 |
| 5,317,624 | 5/1994 | Obana et al. | 455/412 |
| 5,434,904 | 7/1995 | Tsuzuki | 455/456 |
| 5,444,761 | 8/1995 | Nagashima | 455/412 |
| 5,559,860 | 9/1996 | Mizikosky | 455/413 |
| 5,636,265 | 6/1997 | O'Connell et al. | 455/567 |
| 5,644,620 | 7/1997 | Shimura | 455/421 |
| 5,657,372 | 8/1997 | Ahlberg et al. | 455/414 |
| 5,666,662 | 9/1997 | Shibuya | 455/456 |
| 5,740,538 | 4/1998 | Joyce et al. | 455/456 |
| 5,758,264 | 5/1998 | Bonta et al. | 455/456 |
| 5,845,208 | 12/1998 | Hottinen et al. | 455/525 |
| 5,959,529 | 9/1999 | Kail, IV | 340/539 |

FOREIGN PATENT DOCUMENTS

| | | |
|---|---|---|
| 4-196949 | 7/1992 | Japan . |
| 6-37711 | 2/1994 | Japan . |
| 7-274251 | 10/1995 | Japan . |
| 2 255 258 | 10/1992 | United Kingdom . |

Primary Examiner—Daniel S. Hunter
Assistant Examiner—Thuan T. Nguyen
Attorney, Agent, or Firm—Whitham, Curtis & Whitham

[57] ABSTRACT

An auto-response mechanism in a wireless device is switched to active only when the device is in motion and is switched to inactive when stationary. To achieve this function, the wireless device has a signal receiving part which detects and receives a signal of a waiting control channel, a control part which carries out frequency number control of a signal receiving part and a signal transmitting part, extracts received electrical field information and control channel information, and automatically completes the circuit when a call arrives. Also included is a received signal information memory part 11 which periodically stores the control channel information and the electrical field information, and a arrival signal mode memory 12 which stores the setting and cancellation of the auto-response mode. Additionally, the wireless device periodically reads information from the received signal information memory part 11, determines the condition of motion based on changes in this information, and based on said determination results, stores the setting and cancellation of the auto-response in the arrival signal mode memory part 12.

16 Claims, 3 Drawing Sheets

| R 4 | P 2 | CAC 112 | SW 20 | CC 8 | CAC 112 | E 22 |

FIG.2

| INFORMATION ELEMENT | DIRECTION | TYPE | INFORMATION LOG | NOTES |
|---|---|---|---|---|
| MESSAGE TYPE | DOWN | M | 1 | |
| NETWORK NUMBER | DOWN | M | 2 | |
| REGULATION INFORMATION | DOWN | M | 3 | |
| CONTROL CHANNEL STRUCTURE INFORMATION | DOWN | M | 6~33 | |
| MOBILE STATION SIGNAL TRANSMISSION ELECTRICAL POWER INDICATION | DOWN | M | 1 | FOR CONTROL CHANNEL |
| WAIT PERMISSION LEVEL | DOWN | M | 1 | |
| WAIT DETERIORATION LEVEL | DOWN | M | 1 | |
| POSITION REGISTER AREA MULTIPLEX NUMBER (N) | DOWN | M | 1 | 1,2,4,8 OR 16 |
| POSITION NUMBER | DOWN | M | 1 | FIRST NUMBER |
| ~ | ~ | ~ | ~ | ~ |
| POSITION NUMBER | DOWN | M | 1 | NTH NUMBER |
| LARGEST REPORT CHANNEL NUMBER | DOWN | M | 1 | 0~M |
| PRESENT ZONE/CENTER DETERMINATION PERCH CHANNEL NUMBER (M) | DOWN | M | 1 | 0~20 |
| PERCH CHANNEL NUMBER | DOWN | O | 1 | FIRST NUMBER |
| ~ | ~ | ~ | ~ | ~ |
| PERCH CHANNEL NUMBER | DOWN | O | 1 | MTH NUMBER |
| POSITION REGISTER TIMER | DOWN | M | 1 | |
| EXTENDED INFORMATION ELEMENT LOG (K) | DOWN | M | 1 | 0~127 |
| (EXTENDED INFORMATION ELEMENT) | DOWN | O | K | FOR OPERATOR OPTION |

WIRELESS DEVICE WITH AUTOMATIC AUTO-RESPONSE SETTING FUNCTION

BACKGROUND OF THE INVENTION

The present invention relates particularly to a portable device, for example, car telephones, portable telephones, and cordless telephones, possessing an auto-response function.

This application is based on patent application No. Hei 8-282661 filed in Japan, the content of which is incorporated herein by reference.

BACKGROUND ART (Background Art 1) Japanese Patent Application, First Publication Hei 7-274251

When a call is received from a phone line at a wireless extension phone, if the wireless extension telephone in not in the communication area of the wireless main telephone, the apparatus disclosed in the above publication switches the mode to the answering machine by a switching means, records a message from the caller in the message memory means, and calls an outside line.

In this way, the wireless main telephone automatically sets or cancels the answering machine mode based on the condition of communication between it and the wireless extension.

Therefore, it is not necessary for the user to set the answering machine mode when bringing the wireless extension telephone outside of its communication range, or cancel the answering machine mode when bringing the wireless extension telephone inside its communication range.

(Background Art 2) Japanese Patent Application, First Publication Hei 4-196949

In the apparatus disclosed in the above publication, the base station is provided with an ID detection means which detects an ID indicating the mobile station which is the object of the message item sent from another base station, and a message item delivery means which delivers a message item to a mobile station sent from another base station based on the detection result of the detection means. Also, the mobile station is provided with a message item memory means that stores the message item sent from the base station.

In this way, when the mode is set to the answering machine mode, the caller can store a message item at any arbitrary mobile station by sending the mobile station ID he wants to send a message to after the response message has been delivered.

Therefore, it is possible to store a message item at the mobile station which the base station indicates. Also, the mobile station does not have to extract message items for it.

(Background Art 3) Japanese Patent Application, First Publication Hei 6-37711

In the apparatus disclosed in the above publication, when a car telephone is set to auto-receive by an operation part, if there is a call, the car telephone automatically receives the message, goes into a communication condition, and the message guidance is sent from a voice response part. The caller enters the telephone number from a PB button according to this guidance message. The telephone number entered by the caller is received by a PB signal detection part, and stored in memory. The car telephone subscriber displays the telephone number in a display part by operating the operating part, and after confirming the telephone number, by operating the operating part one more time, can automatically dial the telephone number displayed on the display part.

In this way, even if the car telephone subscriber cannot respond at the time of the call to the call received by the car telephone, by storing and displaying the telephone number sent by the caller to the car telephone, the car telephone can be used efficiently, and because the telephone number sent is auto-dialed, misdialing is eliminated.

Because an auto-response function completes the telephone connection without the intervention of user operations, while moving, and in particular while driving, if the auto-response or answering machine functions are used effectively, manipulation of the wireless device which can easily cause traffic accidents while driving are eliminated, making it is very useful.

Incidentally, there is the problem that in receiving messages while in operation (while driving a car, etc.), these conventional wireless devices cannot be applied in situations where immediate response cannot be made.

The reason is that in conventional wireless devices, the setting for the auto-response device is fixed after being set by the user, and when the auto-response is set ineffectively, if one encounters a situation when it is necessary to use it while moving, it does not function.

SUMMARY OF THE INVENTION

One object of the present invention is to present a wireless device which, against the above background, besides the effects of small size, light weight, and operational improvement, can respond to conditions in which the auto-response and answering machine are useful, by automatically setting the auto-response mode according to the condition of the motion of the wireless device even when the user is not aware of the setting of the auto-response mode.

This invention is characterized in possessing a means to control the auto-response to a call signal from a base station, a means to detect the reception level of the electric field of the signal sent from the base station, and a means to set the auto-response when the detected electric field level changes exceeding a predetermined electrical field range within a predetermined time.

In addition, a separate characteristic of this invention is possessing a means for controlling the auto-response to a call signal from the base station, and a means for detecting the channel number based on the frequency of the signal sent from the base station, and when channel number detected surpasses a predetermined wave number within a predetermined time, the auto-response is set.

In addition, a separate characteristic of this invention is possessing a means for controlling the auto-response to a call signal from the base station, and a means for detecting information particular to the base station from the signal sent from the base station, and when information particular to the base station period, excluding existing area base stations, is detected within a predetermined time, the auto-response is set.

In addition, a separate characteristic of this is invention is possessing a means to control the auto-response to a call signal from the base station, and a means that detects information showing the Location Identity of the wireless device, and when an update in Location Identity information being used is detected within a predetermined period of time, the auto-response is set.

In addition, this invention is characterized in possessing a means which detects a channel number based on the frequency of the signal sent from the base station when the auto-responder is effectively set, and when the detected channel number is within a predetermined wave number within a predetermined time, the auto-responder is deactivated.

In addition, this invention is characterized in possessing a means which detects information particular to a base station by a signal sent from the base station when the auto-responder is activated, and when the information particular to the base station, excluding existing area base stations, does not exceed the predetermined updated number within a predetermined time period, the auto-response is inactivated.

In addition, this invention is characterized in possessing a means which detects information showing the Location Identity of the wireless device being used by a signal sent from the base station when the auto-responder is activated, and when an update of the predetermined Location Identity information is not detected within a predetermined time period, the auto-response is deactivated.

As explained above, according to this invention, the condition of movement of the wireless device is determined by the condition of electric waves and the reported information received, the auto-response is automatically set or canceled while in motion, so the user is not troubled with setting or canceling the auto-response by making judgments about the conditions.

BRIEF DESCRIPTION OF THE DRAWINGS

FIG. 2 is an explanatory diagram showing an example of the contents of reported information according to the same embodiment.

DESCRIPTION OF THE PREFERRED EMBODIMENTS

Below, an embodiment of the present invention will be explained in reference to the figures.

Figures 1, 3:
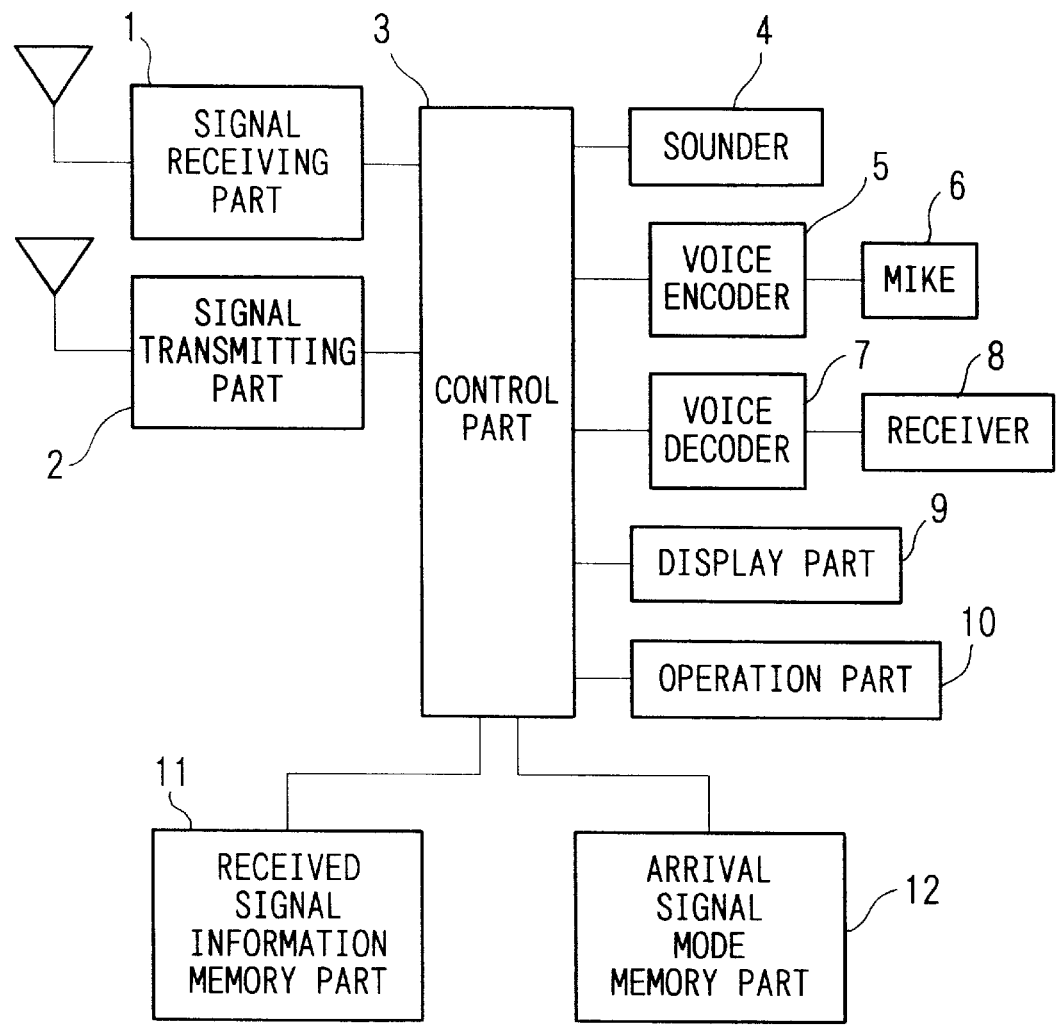
FIG. 1 is a block diagram showing an example of the construction of a portable telephone according to one embodiment of the present invention.
FIG. 3 is an explanatory diagram showing an example of the signal format according to the same embodiment.

FIG. 1 is a block diagram showing an example of the construction of a wireless device (here, a portable telephone) possessing an auto-response function according to the embodiment of the present invention.

The portable telephone of the present invention possesses a signal receiving part 1 which detects and receives the wait control channel, a control part 3 (including MPU) that performs frequency control of receiving part 1 and extracts the received control channel information and the electrical field, a received information memory part 11 which stores the control channel information and electrical field, and a sounder 4 which outputs a signal arrival warning when called.

Also, because of the realization of communication functions of digitally formatted portable telephones, it possesses signal transmitting part 2 and signal receiving part 1, and a control part 3 (including MPU) which detects a call connection signal and voice signal data from the received communication signal, and converts the call control signal to be transmitted and the voice signal to be transmitted into a communication signal, and makes possible call connections such as transmission and reception of signals.

In addition, in order to realize the communication function, it has a voice decoder 7 that converts the received voice signal into an analogue voice signal, a receiver 8 that outputs the received voice, a microphone 6 for inputting the voice to be transmitted, and a voice encoder 5 that converts the voice analogue signal to be transmitted into a voice data signal.

It also has an operation part 10 which inputs the dial information and function settings, and a display part 9 that displays the input information.

Further, in order to realize the characteristics of the present invention, it has an arrival signal mode memory part 12. The control part 3, as will be described later, periodically reads the control channel information and the electrical field from the received signal information memory part 11, and based on a determination of the condition of motion, stores the setting of the auto-responder as activated or not, and at the time of a signal arrival, reads the arrival signal mode from the arrival signal mode memory part 12, and determines whether the auto-respond mode is activated or canceled, and switches the operation of the auto-response function.

Next, the operation of the wireless device having the auto-response function according to the above-described construction will be explained.

First, the signal arrival operation for a portable telephone will be explained.

The signal receiving part 1, which includes the wireless circuit part, the wave form formation circuit, the timer circuit, etc., produces a digital signal from the communication signal included in the control channel.

The control part 3 carries out a channel scan based on the wave form control of the signal receiving part 1, and reads the reported information from the digital signal of the control channel that is input from the receiving part 1, and based on the wait condition of the threshold level of the electric field, selects a wait-enabled control channel, putting the apparatus into the waiting condition with the selected control channel. FIG. 2 is an explanatory figure showing an example of the content of the reported information according to the present embodiment. Moreover, the "position number" shown in this figure may correspond to the "information indicating the position of the wireless device" described in claim 4.

At the time of signal arrival, as paging information, the caller number, call setting information, etc., of the message are transmitted from the base station to the waiting control channel.

Control part 3 detects this paging information, and compares it to its own station number included in the call number and the ROM inside the control part, and if it agrees, notifies the user of the signal arrival condition by sounding the sounder 4, detects the input of the response operation of the user by the operation part 10, and via the signal transmitting part 2 and the signal receiving part 1, completes the communication line by transmitting and receiving the caller control signal based on the order of the calling procedure.

Next, in the portable telephone in FIG. 1, a characteristic of the present invention, that is, the method of switching the setting of the auto-response according to the condition of the wireless, will be explained.

In the system of communication of the portable object, base stations are placed at regular intervals in the area, and each base station regularly transmits a control channel comprising reported information that includes the necessary position information, etc., for the portable telephone.

Here, concerning the frequency of the control channel, a control channel of different frequency is allotted to each base station so as not to interfere with the user channels of other base stations. Also, an interference prevention code particular to each base station is included in the control channel. FIG. 3 is an explanatory diagram showing an example of a signal format that includes the interference prevention code of the present embodiment. In this figure, R is the burst crossing response guard time, P is the preamble, SW is the synchronism word, CC is the interference prevention code, CAC is the control signal, and E is the impact control bit. Also, in the figure, the numbers are the bit numbers.

Because of this, along with the movement of the portable telephone, the electric field level of-each control channel receiving a signal changes, and the wait-enabled control channel also changes. Also, when movement occurs through a plurality of base station areas, by receiving the signal of the control channel of the respective different base stations, the interference prevention code is also changed.

Figure 4:
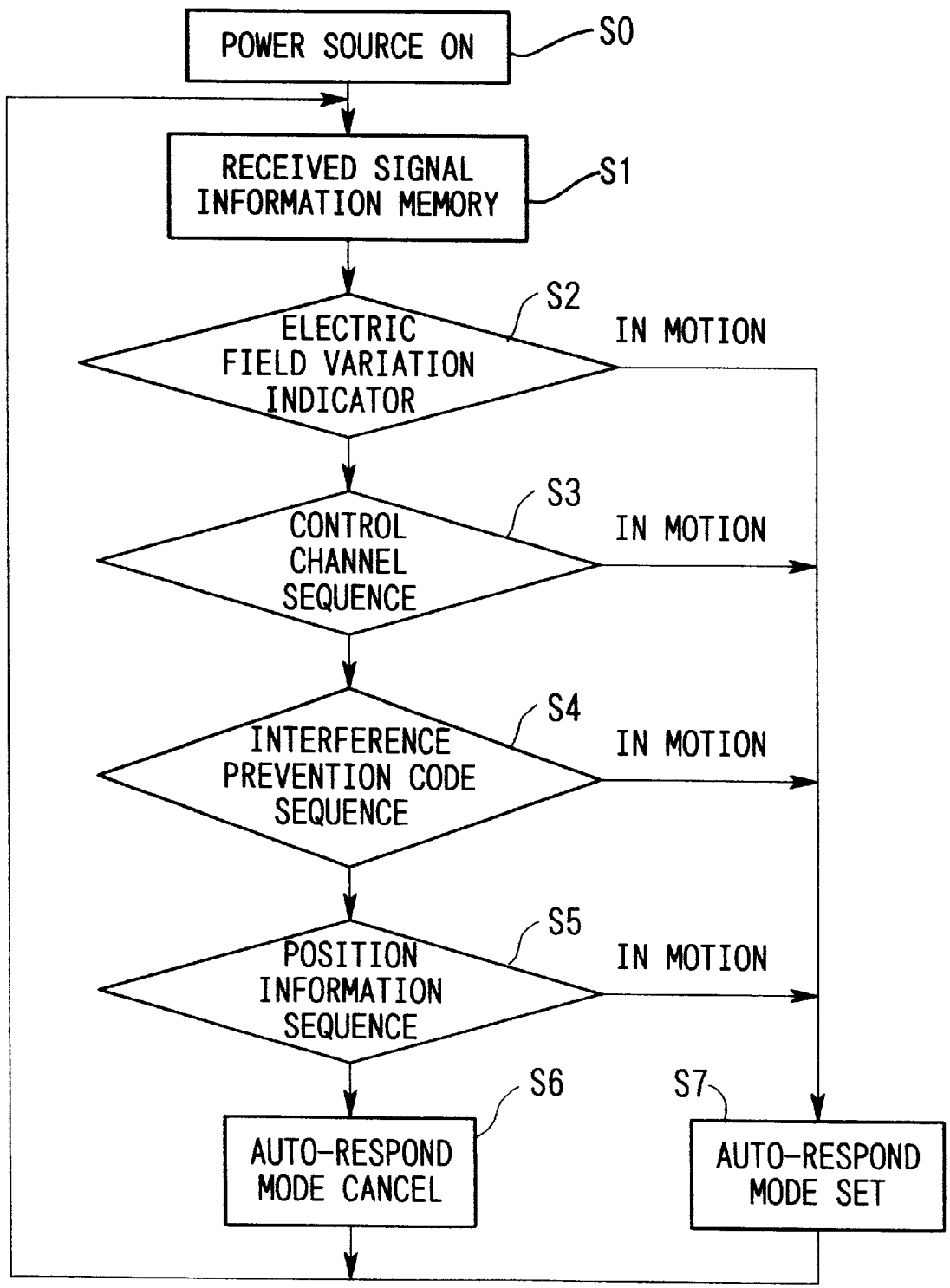
FIG. 4 is a flow chart showing an example of the operation of the portable telephone according to the same embodiment.

The portable telephone of the present invention, as shown in FIG. 4, determines the condition of motion of the wireless device by detecting the electric field level (step S2), the control channel (step 3), the interference prevention code (step 4), and the changing condition of the position information (step 5). As a planar range which determines the condition of motion changing over a wide range, on the construction of the system, because this detection parameter changes over a wide range in the order of position information, interference prevention code, control channel, and electric field level, the condition of change is detected in the opposite order.

First, at step S0 shown in FIG. 4, when the power source is inserted into the portable telephone, control part 3 carries out a channel scan based on the frequency control of the receiving signal part 1. And when a control channel of a predetermined frequency exists, the control part 3 reads the reported information from the control channel, selects the channel matching the waiting condition of the electric field determination condition, etc., and sets the present apparatus at waiting condition with the chosen control channel.

Below, the processing of step S1 to S7 are periodically repeated.

In step S1, in the waiting condition, control part 3, detects the electric field level, the interference prevention code, and the position information from the information in the received control channel by receiving signal part 1, and stores them in the received signal information memory part 11 along with the selected channel number.

And reading the above-mentioned stored information, determines whether or not to activate the auto-response function from conditions 1–4 shown below.
Condition 1

In step S2, when a predetermined amount of change (for example, a change in amount of more than 10 dB within 3 minutes) for the electric field for each channel 1 as read from the received signal information memory part 11 is detected, the control part 3 deems it to be "in motion," proceeds to step S7, and sets the activation setting (the "in motion" setting) of the auto-responder in the arrival signal mode memory part 12.

Otherwise, when there is not a predetermined amount of change (for example, more than 10 dB of change within three minutes) recognized in the electrical field read from the received signal information memory part 11, control part 3 determines that the condition is not in motion, and carries out determinations according to the next condition.
Condition 2

In step S3, when the wait-enabled control channel read from the received signal information memory part 11 is updated more than a predetermined number of times (for example, more than twice within three minutes), the control part 3 deems it to be "in motion", proceeds to step S7, and the activation setting (the "in motion" setting) of the auto-responder is set in the arrival signal mode memory part 12.

Otherwise, when there is not a predetermined amount of change (for example, more than 10 dB of change within three minutes) recognized in the electrical field read from the receiving signal information memory part 11, control part 3 determines that the condition is not in motion, and carries out determinations according to the next condition.
Condition 3

In step S4, when the interference prevention code of the control channel is updated a predetermined number of times (for example, more than two times in three minutes), the control channel 3 deems it to be in motion, proceeds to step S7, and sets the auto-response function to active (set to "in motion") in the arrival signal mode memory part 12.

Otherwise, when the interference prevention code of the control channel is not updated a predetermined number of times (for example, once within three minutes), the control part 3 determines that the condition is not in motion, and the determination according to the next condition is carried out.
Condition 4

In step S5, when the position information of the control channel id updated a predetermined number of times (for example, one time in three minutes), the control part 3 deems it to be "in motion", proceeds to step S7, and sets the auto-response function to active in the signal arrival mode memory part 12.

Otherwise, when the position information of the control channel is not updated (for example, once within three minutes), the control part deems it not in motion from the determination of steps S2–S5, and proceeds to step S6.

In step S6, the control part 3 stores the setting of the auto-response function as inactive (if it is already set to auto-response, the setting is canceled) in the arrival signal mode memory part 12.

At the time of signal arrival, on the waiting control channel, a calling number, call setting information, etc. messages are transmitted from the base station as paging information.

The control part 3 detects this paging information, compares the call number and one's own station number (included in ROM within the control part 3), and when they both agree, the user is informed of the signal arrival condition by sounding the sounder 4. At the same time, the control part 3 reads the setting content from the arrival signal mode memory part 12, and when the auto-response mode is set, via the signal transmitting part 2 and the signal receiving part 1, transmits the call control signal, and automatically completes the phone call circuit based on the order of the call connection.

Above, while the embodiment of this was explained in detail in reference to the figures, concrete construction is not limited this embodiment, and when the are such changes in the range of the design not deviating the intention of this invention, they will be included in this invention.

Below we will explain the differences between the present invention and the above-mentioned conventional technologies 1–3.

Differences Between the Present Invention and Conventional Technology 1

The present invention makes possible the above functions in an independent wireless device without a main telephone. Also, in the conventional technology 1, the main telephone, sets the main telephone's answering function based on whether or not the extension telephone is in the communication range. However, in the present invention, by determining the wireless signal reception condition of the wireless device itself, the auto-response or answering mode is set.

In this manner, the present invention sets or cancels the auto-response based on the channel information received by the wireless device, not by determining the communication condition in both directions by the transmitting and receiving signal of the wireless device.

Therefore, the present invention can determine the movement condition of the wireless device independently of whether it is inside or outside the communication range, and in this manner, by making possible an auto-response mode, not just an answering mode, the operationality when in motion is improved.

Differences Between the Present Invention and Conventional Technology 2

The present invention does not need a means for transmitting message items to a portable station, nor does it need a means for detecting an ID.

That is, the present invention has no relation with IDs or message items. The present invention switches the auto-response or answering function to active or inactive depending on the condition of motion of the portable device.

The effect of the present invention is making possible automatically setting the auto-response, answering function, etc., according to the condition of motion of the wireless device, and it is unnecessary to extract message items to itself.

Differences Between the Present Invention and Conventional Technology 3

The present invention does not need a means for detecting a PB signal.

Also, the operation of the present invention does not transmit the dial signal based on a received PB signal, but based on the signal reception information of the wireless, detects whether the portable device is in motion, and based on the result of the determination, switches the auto-response or the answering function to either active or inactive.

Therefore, because the auto-response is activated even without the operation of the caller, the effect of the present invention does not inconveniently involve the hands of the caller. Also, the effect of the present invention increases the operationality and eliminates loss of the communication opportunity by activating the auto-response function while in motion, when the auto-response is considered to be most effective.

What is claimed is:

1. A wireless device comprising:
    a control means for controlling an auto-response to a caller signal from a base station;
    a detecting means for detecting a level of an electrical field of a signal received from the base station; and
    a means for setting said auto response when a change exceeds a predetermined range of the electrical field level within a predetermined time.

2. A wireless device according to claim 1, further comprising:
    a channel number detecting means for detecting a channel number based on a frequency of the signal received from the base station when the auto-response is active, and
    when the detected channel number is within a predetermined numbers of waves within a predetermined time, said auto-response is set.

3. A wireless device according to claim 1, wherein said auto-response is inactivated when the detecting means that detects unique information from the base station based on a signal received from the base station when the auto-response is active, and when the unique information from a base station other than the base stations within the communication range has not exceeded a predetermined number of updates within a predetermined time.

4. A wireless device according to claim 1 wherein said auto-response is set to inactive when a means that detects information indicating the position of the wireless device in use based on a signal sent from a base station while the auto-response is active, and when a predetermined updated number of the position information is not detected within a predetermined time.

5. A wireless device comprising:
    a control means for controlling an auto-response to a caller signal from a base station; and
    a channel number detecting means for detecting a channel number based on the frequency of the signal received from the base station;
    wherein the detected channel number exceeds a predetermined wave number within a predetermined time, said auto-response is set.

6. A wireless device according to claim 5, further comprising:
    a channel number detecting means for detecting a channel number based on the frequency of the signal received from the base station when the auto-response is active, and when the detected channel number is within predetermined numbers of waves within a predetermined time, said auto-response is set.

7. A wireless device according to claim 5, wherein said auto-response is inactivated when the detecting means that detects unique information from the base station based on a signal received from the base station when the auto-response is active, and when the unique information from a base station other than the base stations within the communication range has not exceeded a predetermined number of updates within a predetermined time.

8. A wireless device according to claim 5 wherein said auto-response is set to inactive when a means that detects information indicating the position of the wireless device in use based on a signal sent from a base station while the auto-response is active, and when a predetermined updated number of the position information is not detected within a predetermined time.

9. A wireless device comprising:
    a control means for controlling an auto-response to a caller signal from a base station; and
    an information detecting means for detecting information particular to the base station based on a signal received from the base station;
    wherein unique information from a base station other than the base station within a communication range is detected, said auto-response is set.

10. A wireless device according to claim 9, further comprising:
    a channel number detecting means for detecting a channel number based on a frequency of the signal received from the base station when the auto-response is active, and
    when the detected channel number is within a predetermined numbers of waves within a predetermined time, said auto-response is set.

11. A wireless device according to claim 9, wherein said auto-response is inactivated when the detecting means that detects unique information from the base station based on a signal received from the base station when the auto-response is active, and when the unique information from a base station other than the base stations within the communication range has not exceeded a predetermined number of updates within a predetermined time.

12. A wireless device according to claim 9 wherein said auto-response is set to inactive when a means that detects information indicating the position of the wireless device in use based on a signal sent from a base station while the auto-response is active, and when a predetermined updated number of the position information is not detected within a predetermined time.

13. A wireless device comprising:

a control means for controlling an auto-response to a caller signal from a base station; and a detecting means for detecting information showing a position of the wireless device based on a signal received from a base station;

wherein when an update of said position signal is detected within a predetermined time said auto-response is set.

14. A wireless device according to claim 13, further comprising:

a channel number detecting means for detecting a channel number based on a frequency of the signal received from the base station when the auto-response is active, and when the detected channel number is within a predetermined numbers of waves within a predetermined time, said auto-response is set.

15. A wireless device according to claim 13, wherein said auto-response is inactivated when the detecting means that detects unique information from the base station based on a signal received from the base station when the auto-response is active, and when the unique information from a base station other than the base stations within the communication range has not exceeded a predetermined number of updates within a predetermined time.

16. A wireless device according to claim 13 wherein said auto-response is set to inactive when a means that detects information indicating the position of the wireless device in use based on a signal sent from a base station while the auto-response is active, and when a predetermined updated number of the position information is not detected within a predetermined time.

* * * * *